UNITED STATES PATENT OFFICE.

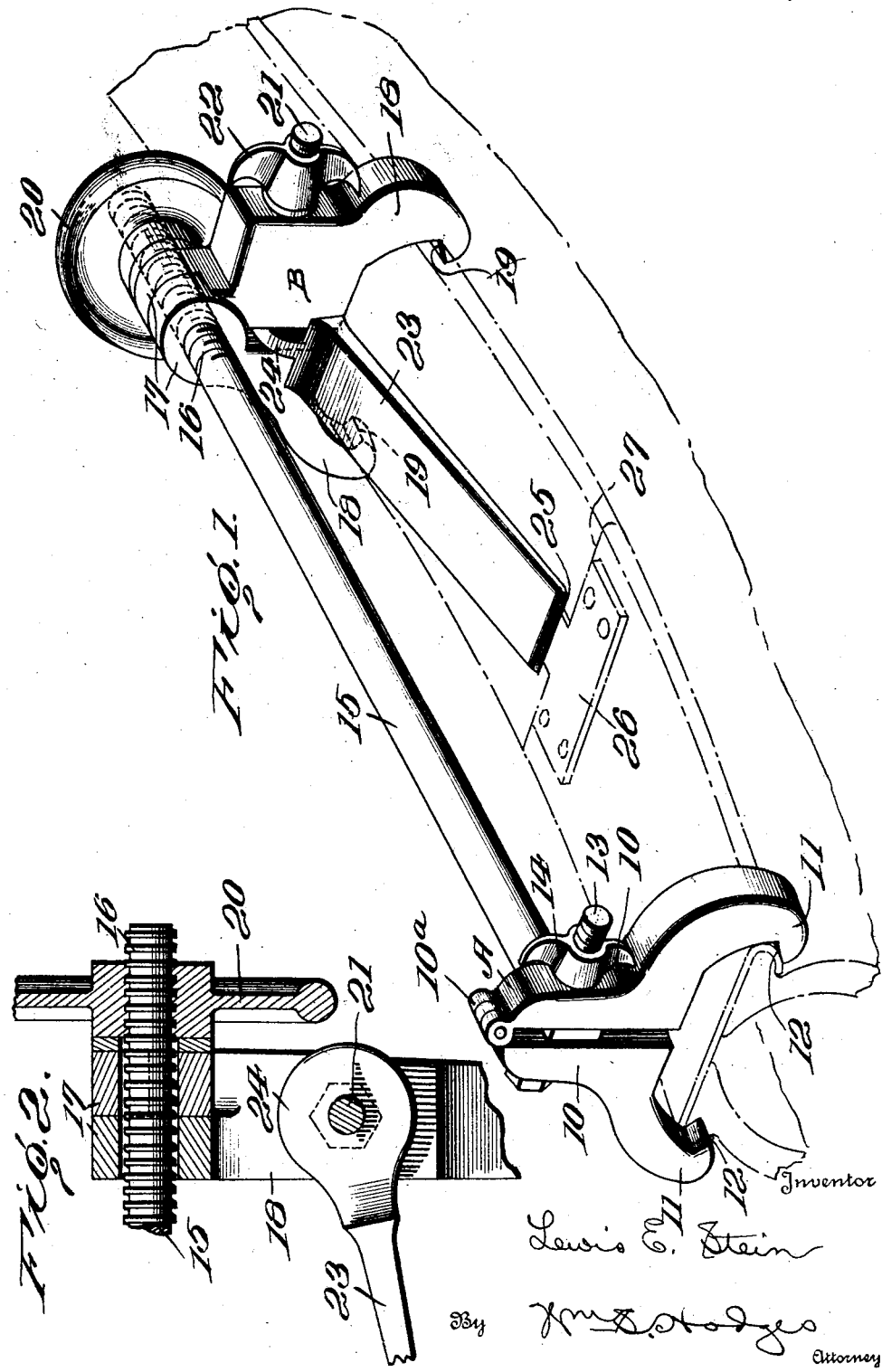

LEWIS E. STEIN, OF WASHINGTON, DISTRICT OF COLUMBIA.

RIM TOOL.

1,404,065.  Specification of Letters Patent.  Patented Jan. 17, 1922.

Application filed November 21, 1919. Serial No. 339,609.

*To all whom it may concern:*

Be it known that I, LEWIS E. STEIN, a citizen of the United States, residing at Washington, D. C., have invented a new and useful Rim Tool, of which the following is a specification.

This invention is a device for use in contracting split rims of the type now in common use on motor vehicles.

One of the objects of the invention is to provide a simple device by means of which the ends of the rim forming the joint, may be readily separated and the diameter of the rim reduced sufficiently to apply or remove the tire. A further object is to provide a device of the character mentioned which when not in use may be disassembled so as to take up but little space for storage.

The invention will be hereinafter fully set forth and particularly pointed out in the claims.

In the accompanying drawing:—

Figure 1, is a perspective view illustrating the invention. Figure 2, is a detail sectional view illustrating the mounting of the adjusting screw and of the lifting member.

Referring to the drawing A and B designate clamp members capable of engaging the sides of a split rim. The clamp member A consists of two sections 10, hinged together at 10ª, each having a hook-like portion 11, provided with a shoulder 12 shaped to engage and grip the side of the rim. The two sections 10 are relatively adjusted by means of a bolt 13, provided with a wing nut 14. The bolt 13 is also passed through one end of a rod 15, the other end being threaded at 16.

The clamp member B consists of two sections 17 slidably and pivotally mounted on the rod 15, and each provided with a hooklike portion 18 having a shoulder 19 shaped to engage and grip the side of the rim. The sections 17 have complemental offset portions so that they cooperate to provide two pivotally related gripping sections disposed opposite to each other. Working upon the threads 16 is a nut 20 which bears against the clamp member B, and the relative distance between the two clamping members is regulated by adjusting said nut.

The members 17 of the jaw B are adjustably connected by means of a bolt 21 provided with a wing nut 22, and pivotally mounted upon said bolt is a lifting member 23. Said lifting member has one end provided with an ear 24 shaped to extend between the members 17, the free end of said lifting member, indicated at 25, being positioned to engage the latch 26 which serves to lock the meeting ends 27 of the wheel rim.

In practice, the rod 15 is connected to the clamp member A by passing the bolt 13 through the end of said rod and adjusting the wing nut 14 to prevent separation of the sections 10. The threaded end of the rod 15 is then passed through the sections 17 and the nut 20 applied to the rod. The lifting member 23 may be attached to the clamp member B before the latter is applied to the rod 15 or after, as desired. The clamp member A is then applied to the sides of the wheel rim and adjusted to a gripping engagement by the wing nut 14. Likewise, the clamp member B, is engaged with the wheel rim, and the sections 17 brought into gripping engagement with the rim by adjusting the wing nut 22. The clamps are so positioned that the free end of the lifting member 23 engages the latch 26. The operator then actuates the nut 20 in a direction tending to draw the clamp members A and B together, the clamp B sliding along rod 15, and this action has a two-fold effect, i. e. it tends to spring the ends 27 slightly apart and to cause the latch 26 to ride up upon the lifting member 23. The instant that this lifting action takes place to a sufficient extent to bring the ends 27 out of register, continued actuation of the nut 20 will cause the rim to contract by bringing said ends in overlapping relation in which position they may be securely retained. When it is desired to expand the tire it is only necessary to unscrew the nut 20 and the natural resiliency of the rim will cause it to expand as the tension is reduced.

From the foregoing it will be readily perceived that by means of the invention a simple and efficient device has been produced which does not take up much room when not in use but which is capable of quickly contracting a wheel rim and retaining it in contracted relation as long as it is desired. It is to be understood that although wing nuts have been illustrated for the purpose of obtaining the various adjustments the invention is not limited thereto but contemplates the use of equivalent devices within the scope of the appended claims.

Having thus explained the nature of the invention and described an operative manner of constructing and using the same, although without attempting to set forth all of the forms in which it may be made, or all of the forms of its use, what is claimed is—

1. A rim tool of the character described comprising a normally stationary clamp member, a slidably supported clamp member, means for adjusting the slidable clamp member relative to the normally stationary clamp member, and a lifting member pivotally connected at one end with one of said clamp members, the other end being free to rest upon the rim whereby it will engage the joint of said wheel rim and raise the latch thereof as the clamps approach each other.

2. A rim tool of the character described comprising a clamp member, an adjusting rod connected at one end thereto, a second clamp member slidably and pivotally mounted upon said rod, and a lifting member having one end pivotally connected with the last mentioned clamp member, the free end of said lifting member being positioned to rest upon the rim whereby it will engage the joint of the rim and raise the latch thereof as said second clamp member slides upon said rod.

3. A rim tool of the character described comprising a clamp member, an adjusting rod pivoted at one end to said clamp member, clamp sections slidably and pivotally mounted upon said rod and free to swing laterally, means for adjusting said clamp sections relative to the clamp member, and a lifting member pivotally supported by said clamp sections, said lifting member having a free end positioned to engage the joint of the wheel rim whereby it will raise the latch thereof as the clamp sections approach each other.

4. A rim tool of the character described comprising a clamp member, a rod pivotally connected at one end to said clamp member, clamp sections slidably and pivotally mounted upon said rod and relatively adjustable, a bolt passed through said clamp sections and having means for maintaining the sections in adjusted relation, means for adjusting said clamp sections relative to said clamp member, and a lifting member pivotally engaging said bolt, said lifting member having a free end positioned to engage the joint of the wheel rim whereby it will raise the latch thereof as the clamp sections approach each other.

5. A rim tool of the character described comprising a pair of clamp sections, a bolt connecting said sections, and having means for maintaining them in adjusted relation, a rod having one end pivotally connected to said bolt and its other end threaded, a pair of clamp sections slidably and pivotally mounted upon the threaded end of said rod, a bolt passed through the last mentioned clamp sections and having means for maintaining them in adjustable relation, a lifting member pivoted upon said last mentioned bolt and a nut working upon the threaded end of said rod and positioned to engage and move the slidable clamp sections.

In testimony whereof I have hereunto set my hand.

LEWIS E. STEIN.